(12) United States Patent
Züerl et al.

(10) Patent No.: US 8,219,444 B2
(45) Date of Patent: Jul. 10, 2012

(54) SYSTEM AND METHOD FOR USING SALES PATTERNS WITH MARKDOWN PROFILES

(75) Inventors: Ruediger Züerl, Eschelbronn (DE); Hergen Busch, Chicago, IL (US); Christine Fotteler, Winnetka, IL (US)

(73) Assignee: SAP Aktiengesellschaft, Walldorf (DE)

( * ) Notice: Subject to any disclaimer, the term of this patent is extended or adjusted under 35 U.S.C. 154(b) by 1564 days.

(21) Appl. No.: 10/931,936

(22) Filed: Sep. 1, 2004

(65) Prior Publication Data

US 2005/0197887 A1   Sep. 8, 2005

Related U.S. Application Data (60) Provisional application No. 60/551,221, filed on Mar. 8, 2004, provisional application No. 60/563,284, filed on Apr. 16, 2004.

(51) Int. Cl.
*G06Q 30/00* (2012.01)
(52) U.S. Cl. ................................ 705/14.1
(58) Field of Classification Search ............ 705/14.1
See application file for complete search history.

(56) References Cited

U.S. PATENT DOCUMENTS

| | | | |
|---|---|---|---|
| 5,400,253 A | 3/1995 | O'Connor | |
| 5,615,109 A | 3/1997 | Eder | |
| 5,689,696 A | 11/1997 | Gibbons et al. | |
| 5,930,771 A | 7/1999 | Stapp | |
| 5,933,813 A | 8/1999 | Teicher et al. | |
| 6,507,851 B1 | 1/2003 | Fujiwara et al. | |
| 6,910,017 B1* | 6/2005 | Woo et al. | 705/7.29 |
| 6,976,001 B1 | 12/2005 | Levanoni et al. | |
| 6,980,966 B1 | 12/2005 | Sobrado et al. | |
| 7,080,066 B1 | 7/2006 | Scheurich et al. | |
| 7,082,066 B2 | 7/2006 | Yamada | |
| 7,092,402 B1 | 8/2006 | Smith et al. | |
| 7,092,929 B1* | 8/2006 | Dvorak et al. | 705/28 |
| 7,117,165 B1 | 10/2006 | Adams et al. | |
| 7,130,822 B1 | 10/2006 | Their et al. | |
| 7,139,731 B1 | 11/2006 | Alvin | |
| 7,155,402 B1 | 12/2006 | Dvorak | |
| 7,343,319 B1* | 3/2008 | Walker et al. | 705/21 |
| 7,379,890 B2* | 5/2008 | Myr et al. | 705/10 |
| 7,424,440 B1 | 9/2008 | Gupta et al. | |
| 7,516,083 B1 | 4/2009 | Dvorak et al. | |
| 7,536,337 B2* | 5/2009 | Parkes et al. | 705/37 |

(Continued)

FOREIGN PATENT DOCUMENTS

JP      2004-030343 A    1/2004

OTHER PUBLICATIONS

U.S. Appl. No. 60/374,892, filed Apr. 22, 2002, Krajec.

(Continued)

*Primary Examiner* — Johnna Loftis
*Assistant Examiner* — Luis Santiago
(74) *Attorney, Agent, or Firm* — Foley & Lardner LLP (57) ABSTRACT

A system, method and program product are provided for planning sales of one or more products or services. The method comprises selecting a markdown profile associated with the one or more products or services, selecting a sales pattern associated with the markdown profile, and distributing sales of the one or more products or services using the markdown profile and sales pattern.

18 Claims, 5 Drawing Sheets

Markdown Profile:

| Life cycle (posting periods) | Target sales quota | Actual sales quota | | | | | | | | | |
|---|---|---|---|---|---|---|---|---|---|---|---|
| | | < 10 % | < 20 % | < 30 % | < 40 % | < 50 % | < 60 % | < 70 % | < 80 % | < 90 % | < 100 % |
| 1 | 6% | | | | | | | | | | |
| 2 | 26% | 40 | 20 | | | | | | | | |
| 3 | 45% | 60 | 60 | 40 | 20 | | | | | | |
| 4 | 65% | 60 | 60 | 60 | 60 | 40 | 20 | | | | |
| 5 | 85% | 60 | 60 | 60 | 60 | 60 | 60 | 40 | 20 | | |
| 6 | 97% | 60 | 60 | 60 | 60 | 60 | 60 | 60 | 40 | 20 | |

U.S. PATENT DOCUMENTS

| | | | |
|---|---|---|---|
| 2001/0032128 A1 | 10/2001 | Kepecs | |
| 2001/0047308 A1 | 11/2001 | Kaminsky et al. | |
| 2001/0049690 A1 | 12/2001 | McConnell et al. | |
| 2002/0023500 A1 | 2/2002 | Chikuan et al. | |
| 2002/0059108 A1* | 5/2002 | Okura et al. | 705/26 |
| 2002/0078159 A1 | 6/2002 | Petrogiannis et al. | |
| 2002/0107713 A1 | 8/2002 | Hawkins | |
| 2002/0123930 A1* | 9/2002 | Boyd et al. | 705/14 |
| 2002/0138336 A1 | 9/2002 | Bakes et al. | |
| 2002/0147668 A1 | 10/2002 | Smith et al. | |
| 2003/0023500 A1 | 1/2003 | Boies et al. | |
| 2003/0028437 A1 | 2/2003 | Grant et al. | |
| 2003/0046195 A1 | 3/2003 | Mao | |
| 2003/0158791 A1 | 8/2003 | Gilberto et al. | |
| 2003/0172007 A1 | 9/2003 | Helmolt et al. | |
| 2003/0229502 A1 | 12/2003 | Woo | |
| 2004/0034580 A1 | 2/2004 | Okamura | |
| 2004/0098358 A1 | 5/2004 | Roediger | |
| 2004/0162763 A1 | 8/2004 | Hoskin et al. | |
| 2004/0186783 A1 | 9/2004 | Knight et al. | |
| 2004/0199536 A1 | 10/2004 | Barnes Leon et al. | |
| 2004/0220861 A1 | 11/2004 | Morciniec et al. | |
| 2005/0055283 A1 | 3/2005 | Zarovinsky | |
| 2005/0060270 A1 | 3/2005 | Ramakrishnan | |
| 2005/0086122 A1 | 4/2005 | Cirulli et al. | |
| 2005/0096963 A1* | 5/2005 | Myr et al. | 705/10 |
| 2005/0102192 A1 | 5/2005 | Gerrits et al. | |
| 2005/0102227 A1 | 5/2005 | Solonchev | |
| 2005/0165659 A1 | 7/2005 | Gruber | |
| 2005/0197946 A1 | 9/2005 | Williams et al. | |
| 2006/0036507 A1 | 2/2006 | Pujar et al. | |
| 2007/0276537 A1 | 11/2007 | Walker et al. | |

OTHER PUBLICATIONS

Achabal, Dale D., PhD, Achieving Business Advantage in Retail Through Advanced Analytics, 2003 Milan Meeting of the Minds, infosys.com/Milan, 31 pgs.

Beyond Markdown Management, Summer/Autumn 03, The 4caster, Iss. 4, vol. 2, 4 pages.

Melcer, Rachel, Local Tech Firm Creates Retail Markdown Tool, Business Courier of Cincinnati, Mar. 24, 2000, 3 pages.

Notice of Allowance for U.S. Appl. No. 10/919,025, mail date Sep. 18, 2008, 4 pages.

Office Action for U.S. Appl. No. 10/872,816, mail date Aug. 27, 2007, 9 pages.

Office Action for U.S. Appl. No. 10/872,816, mail date Feb. 4, 2009, 15 pages.

Office Action for U.S. Appl. No. 10/872,816, mail date Jul. 23, 2009, 9 pages.

Office Action for U.S. Appl. No. 10/872,816, mail date Mar. 17, 2008, 11 pages.

Office Action for U.S. Appl. No. 10/872,816, mail date Mar. 24, 2010, 20 pages.

Office Action for U.S. Appl. No. 10/872,816, mail date Sep. 2, 2008, 12 pages.

Office Action for U.S. Appl. No. 10/900,975, mail date Apr. 26, 2005, 16 pages.

Office Action for U.S. Appl. No. 10/900,975, mail date Apr. 4, 2008, 18 pages.

Office Action for U.S. Appl. No. 10/900,975, mail date Apr. 7, 2006, 9 pages.

Office Action for U.S. Appl. No. 10/900,975, mail date Aug. 13, 2007, 18 pages.

Office Action for U.S. Appl. No. 10/900,975, mail date Feb. 23, 2009, 21 pages.

Office Action for U.S. Appl. No. 10/900,975, mail date Feb. 8, 2007, 13 pages.

Office Action for U.S. Appl. No. 10/900,975, mail date Jan. 26, 2010, 31 pages.

Office Action for U.S. Appl. No. 10/900,975, mail date Jun. 25, 2009, 31 pages.

Office Action for U.S. Appl. No. 10/900,975, mail date Oct. 10, 2006, 14 pages.

Office Action for U.S. Appl. No. 10/900,975, mail date Oct. 20, 2005, 10 pages.

Office Action for U.S. Appl. No. 10/900,995, mail date Apr. 17, 2008, 14 pages.

Office Action for U.S. Appl. No. 10/900,995, mail date Mar. 22, 2007, 14 pages.

Office Action for U.S. Appl. No. 10/900,995, mail date May 20, 2009, 20 pages.

Office Action for U.S. Appl. No. 10/900,995, mail date Oct. 28, 2008, 15 pages.

Office Action for U.S. Appl. No. 10/900,995, mail date Oct. 4, 2007, 15 pages.

Office Action for U.S. Appl. No. 10/900,995, mail date Oct. 5, 2009, 14 pages.

Office Action for U.S. Appl. No. 10/903,891, mail date Apr. 25, 2005, 12 pages.

Office Action for U.S. Appl. No. 10/903,891, mail date Apr. 7, 2006, 10 pages.

Office Action for U.S. Appl. No. 10/903,891, mail date May 4, 2007, 17 pages.

Office Action for U.S. Appl. No. 10/903,891, mail date Oct. 10, 2006, 17 pages.

Office Action for U.S. Appl. No. 10/903,891, mail date Oct. 21, 2005, 9 pages.

Office Action for U.S. Appl. No. 10/919,025, mail date Feb. 28, 2007, 7 pages.

Office Action for U.S. Appl. No. 10/919,025, mail date Mar. 21, 2008, 12 pages.

Office Action for U.S. Appl. No. 10/919,025, mail date Sep. 25, 2007, 11 pages.

ProfitLogic, available at http://web.archive.org/web/20020603 11838/http://profitlogic.com/, available at least by Apr. 15, 2005, 22 pages.

Retailers Manage Markdown Challenges Using i2 Solutions, Jan. 13, 2003, NRF 92nd Annual Convention & Expo, 2 pages.

Staffware: Staffware and Biomni Join Forces to Provide End-To-End E-Procurement Solution With Enhanced Workflow Capability: Self-Service Functionality Will Enable Thousands of Transactions to Be Handled Daily From the Desktop, M2 Presswire, Coventry, Feb. 6, 2001, 2 pages.

Subrahmanyan et al., Developing Optimal Pricing and Inventory Policies for Retailers Who Face Uncertain Demand, Journal of Retailing, vol. 72, No. 1, Spring, 1996, 15 pages.

Sun and ProfitLogic Help Leading Retailer Optimize Markdowns to Increase Profits, Apr. 2003, Onthewebsun.com/retail, 4 pgs.

Lapide, Larry, "A Simple Approach for Short Product Lifecycle Forecasting", Spring 2001, The Journal of Business Forecasting Methods & Systems, pp. 18-20, 3 pgs.

Notice of Allowance for U.S. Appl. No. 10/872,816, mail date Jun. 22, 2010, 17 pages.

Office Action for U.S. Appl. No. 10/900,995, mail date Apr. 15, 2010, 14 pages.

Elmaghraby et al., "Analysis of a Price Markdown", 2001, pp. 170-177, 8 pages.

Malone, Scott, "The 'New' Buyer: Creativity Takes Back Seat to Biz", Footwear News, Mar. 31, 1997, v53, n13, p. 1, 3 pages.

Mantrala et al., "A Decision-Support System that Helps Retailers Decide Order Quantities and Markdowns for Fashion Goods", Interfaces, May/Jun. 2001, pp. S146-S165, 20 pages.

Mantrala et al., "An Implementable Approach for Optimizing Department Store Mark-Down Decisions", Stores, Apr 1994, v76n4, pp. RR1-RR6, 6 pages.

Notice of Allowance for U.S. Appl. No. 10/900,995, mail date Mar. 31, 2011, 10 pages.

Office Action for U.S. Appl. No. 10/900,975, mail date Mar. 10, 2011, 37 pages.

Smith et al., "A Discrete Optimization Model for Seasonal Merchandise Planning", Journal of Retailing, Summer 1998, v74, n2, p. 193(29), 16 pages.

Notice of Allowance on U.S. Appl. 10/900,975, mail date Jun. 23, 2011, 16 pages.

* cited by examiner

Markdown Profile:

| Life cycle (posting periods) | Target sales quota | Actual sales quota | | | | | | | | | |
|---|---|---|---|---|---|---|---|---|---|---|---|
| | | < 10 % | < 20 % | < 30 % | < 40 % | < 50 % | < 60 % | < 70 % | < 80 % | < 90 % | < 100 % |
| 1 | 6% | | | | | | | | | | |
| 2 | 26% | 40 | 20 | | | | | | | | |
| 3 | 45% | 60 | 60 | 40 | 20 | | | | | | |
| 4 | 65% | 60 | 60 | 60 | 60 | 40 | 20 | | | | |
| 5 | 85% | 60 | 60 | 60 | 60 | 60 | 60 | 40 | 20 | | |
| 6 | 97% | 60 | 60 | 60 | 60 | 60 | 60 | 60 | 40 | 20 | |

FIG. 1

Sales Pattern 1:

| Life cycle (posting periods) | Planned sales quota | Resulting planned markdown |
|---|---|---|
| 1 | 6% | 0 |
| 2 | 26% | 0 |
| 3 | 45% | 0 |
| 4 | 65% | 0 |
| 5 | 85% | 0 |
| 6 | 97% | 0 |

FIG. 3A

Sales Pattern 2:

| Life cycle (posting periods) | Planned sales quota | Resulting planned markdown |
|---|---|---|
| 1 | 3% | 0 |
| 2 | 13% | 0 |
| 3 | 22% | 20 |
| 4 | 32% | 40 |
| 5 | 42% | 60 |
| 6 | 48% | 60 |

SYSTEM AND METHOD FOR USING SALES PATTERNS WITH MARKDOWN PROFILES

CROSS-REFERENCE TO RELATED PATENT APPLICATIONS

This application claims the benefit of U.S. Provisional Patent Application No. 60/551,221, filed Mar. 8, 2004 and entitled "Inventory Management," and U.S. Provisional Patent Application No. 60/563,284, filed Apr. 16, 2004 and entitled "Inventory Management," both of which are hereby incorporated by reference.

FIELD OF THE INVENTION

The present invention is directed generally to the field of marketing of products and services and, more specifically, to the automated control of pricing of products and services to reach sales quotas. The present invention further relates to the forecasting of sales of products and services in connection with assortment planning.

BACKGROUND OF THE INVENTION

Effective pricing of products that are made available for sale is often a complicated task. In order to maximize profits, not only must revenue be optimized, but also the costs of inventory must be taken into account. One strategy used is to periodically reduce the price of the products or services, effecting a markdown, to encourage sales of the products or services. The amount of the markdown is often set by a sales agent who has experience in the market for the products or services and can, using his or her experience and intuition, determine the timing and amount of markdowns.

In particular, the sale of seasonal products poses a high financial risk for merchants. Each seasonal product can be assigned a specific sales period. When high-fashion and fashion products are involved, the merchant wants to have as little remaining stock as possible at the end of the sales period, as it will be difficult to sell this merchandise even with markdowns. In this case, larger remaining stocks translate to higher losses. In addition to fashion products, such as pink raincoats, this also applies to other products, such as computer hardware.

For less "fashionable" products, the risk may be lower because merchants can store any remaining stock and then try to sell it at the normal price again in the same season of the next year. Because storing inventories is expensive, however, merchants will generally prefer to sell their merchandise by the end of the regular sales period.

Merchants use markdowns to ensure that the merchandise is sold out as completely as possible by the end of a season. Markdowns are price reductions or buyer's incentives aimed at promoting the sale of certain products. Of course, markdowns reduce the gross margin, which means the revenue merchants earn for selling the merchandise is less than originally planned. Merchants usually plan a certain budget for markdowns that must not be exceeded. Accordingly, markdowns are applied restrictively in retail, which once again increases the risk of remaining stocks at the end of the season.

Therefore, an important goal in managing seasonal merchandise is to limit markdowns to a minimum and to apply them at the best suitable time, while ensuring that nearly all the merchandise is sold by the end of the season. Another important goal in managing seasonal merchandise is to accurately and efficiently plan sales of products for use during various strategic and operational planning activities such as assortment planning.

SUMMARY OF THE INVENTION

The present invention relates to systems and methods for planning sales of one or more products or services. The systems and methods facilitate accurate and efficient simulations of sales of products and services for use during planning activities such as assortment planning.

An exemplary embodiment relates to a method for planning sales of one or more products or services. The method comprises selecting a markdown profile associated with the one or more products or services, selecting a sales pattern associated with the markdown profile, and distributing sales of the one or more products or services using the markdown profile and sales pattern.

Another exemplary embodiment relates to a system for planning sales of one or more products or services. The system comprises means for selecting a markdown profile associated with the one or more products or services, means for selecting a sales pattern associated with the markdown profile, and means for distributing sales of the one or more products or services using the markdown profile and sales pattern.

Yet another exemplary embodiment relates to a program product for planning sales of one or more products or services. The program product includes machine-readable program code for causing, when executed, one or more machines to perform method steps. The method steps include selecting a markdown profile associated with the one or more products or services, selecting a sales pattern associated with the markdown profile, and distributing sales of the one or more products or services using the markdown profile and sales pattern.

Other features and advantages of the present invention will become apparent to those skilled in the art from the following detailed description and accompanying drawings. It should be understood, however, that the detailed description and specific examples, while indicating exemplary embodiments of the present invention, are given by way of illustration and not limitation. Many modifications and changes within the scope of the present invention may be made without departing from the spirit thereof, and the invention includes all such modifications.

DETAILED DESCRIPTION OF THE EXEMPLARY EMBODIMENTS

One of the features of an exemplary embodiment of the present invention involves the use of one or more sales patterns associated with a markdown profile for planning sales of products and services in multiple different simulations. Using this embodiment, various strategic and operational planning activities that make use of sales projections such as assortment planning may be performed more efficiently and more accurately.

During the course of a sales period or season, the sale price of a product or service may need to be adjusted one or more times to maximize sales and achieve certain sales quota. Under an embodiment of the present invention, these adjustments can be made automatically by the system. Due to the closed loop nature of the system under this embodiment, actual sales information is monitored and can be retrieved from computers at the various sales outlets during the course of a season. Using this information, the system can better determine an accurate price adjustment for the product or service. The automated pricing is based on actual sales, expected sales, the time period during which the product or service has been on sale at the current price or other prices and the time period remaining in the season. The adjusted price can be implemented via a data update transmitted to the computers at the relevant sales outlets.

The markdown profile is a tool used by the system of an exemplary embodiment of the present invention to adjust prices of a product or service. Using the markdown profile, the system can obtain proposed markdowns for a given product at periodic intervals over the life cycle of the sale of that product. The system of the exemplary embodiment may also accept changes and updates from a user to the price of a given product or service.

As mentioned above, an important goal in managing seasonal merchandise and services is to limit markdowns to a minimum and to apply them at the best suitable time, while ensuring that nearly all the merchandise is sold by the end of the season. The markdown profile described herein supports a pricing agent's work during the ongoing season, such as a retail season. The agent forms a correspondence between a product or service and a markdown profile. This markdown profile contains time-specific target data for selling the product or service during its retail life cycle. The sales data of a product or service that sold well in the previous year, for example, could be used as the target sales quota in a markdown profile. The markdown profile is tied to a pricing strategy, which dictates specific price reductions when the actual sales data deviates from the target data. As a result, the system is capable of monitoring the sales data automatically and notifying the agent of any exceptions that occur. In addition, the system can propose certain markdowns in order to reach the planned sales figures. In this approach, the agent is relieved from a large portion of the activities he or she usually has to perform. Using the markdown profile, the agent can obtain proposed markdowns for a given product at periodic intervals over the life cycle of the sale of that product. The agent can choose to accept or reject the proposals, but it is envisioned that in most cases, the proposals will be accepted and the goal of ensuring that nearly all the merchandise is sold by the end of the season is achieved.

Figure 1:
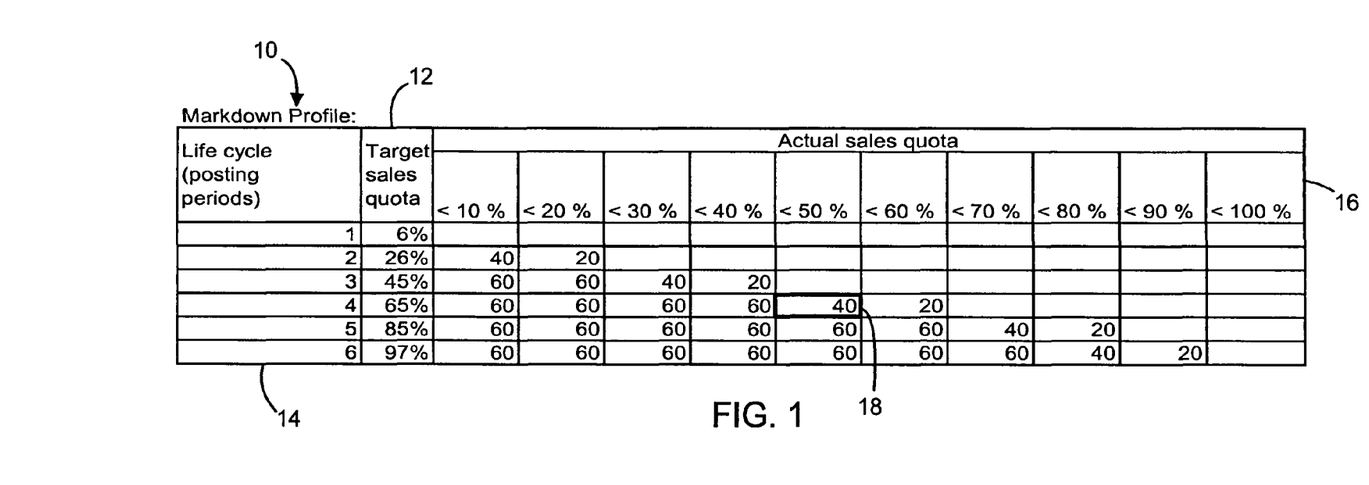
FIG. 1 illustrates a markdown profile in accordance with an exemplary embodiment of the present invention.

Turning now to the Figures, the structure of a markdown profile 10 in an exemplary embodiment of the present invention is illustrated in FIG. 1. Markdown profile 10 specifies the target sales figures for a product or service, that is, the sales quotas for which no markdowns are needed. These target sales quotas are shown in a column 12 in FIG. 1. The target sales quotas are shown in connection with a time reference, which may represent a retail life cycle of the product. In FIG. 1, target sales quotas are shown in connection with corresponding numbered time periods (also known as posting periods) in a column 14. A posting period may correspond to a week in the season of the product, or to any other convenient time period.

The target sales quotas in column 12 are expressed as percentages in markdown profile 10 shown in FIG. 1. These percentages represent the quantity of the products sold divided by the quantity of the products available for sale. Thus, in the example shown in FIG. 1, at the end of the first posting period the target sales quota is six percent. At the end of the second posting period the target sales quota is 26 percent. By the end of the sixth posting period, most of the retail product, that is 97 percent, is targeted to have been sold. The percentages shown in column 12 represent "ideal" sales ratios in the sense that an assumption is made that no markdowns are necessary to achieve the desired sales quotas.

As shown in the markdown profile in FIG. 1, these target sales quotas in column 12 are arranged along a vertical axis in markdown profile 10. Arranged perpendicular to the target sales quota axis is a row 16 representing ranges of actual sales quotas. As with target sales quota, actual sales quota is calculated by taking the actual quantity of products sold and dividing it by the quantity of products available for sale. Each of the ten ranges of actual sales quota shown in row 16 represent 10 percent intervals. It would be apparent to one skilled in the art that any number of ranges or actual percentages could be used. The thresholds for the actual sales quota can be freely defined by the user.

In markdown profile 10, a cell containing the proposed markdown percentage lies at the intersection of each, actual sales quota range in row 16 and each target sales quota in column 12 corresponding to a posting period in column 14. Cells in which no numbers appear indicate that no markdown is proposed. For cells in which numbers do appear, the number indicates the proposed markdown percentage. For example, assume that markdown profile 10 shown in FIG. 1 is being used for a retail product that has been on sale for four posting periods (or four weeks). The sales quota targeted for this product is 65 percent, as shown in target sales quota column 12. Now assume that sales of this product have not met the targeted sales quota and, instead, only 235 out of the 500 items that were in stock have sold. This corresponds to an actual sales quota of 47 percent. Thus, using markdown profile 10 with the actual sales quota of 47 percent, which falls within the range of 40 percent to 50 percent, the intersection of this actual sales quota range with the target sales quota column of 65 percent identifies a cell 18, which contains the number 40. This indicates a proposed markdown of 40 percent.

Thus, in the example described above, the system would indicate to the user that a markdown of 40 percent of the original retail price is proposed for the next posting period. The user can either accept or reject this proposal. In an alternate embodiment of the invention, the proposed markdown from markdown profile 10 is automatically implemented to adjust the retail price of the product. The user can override this automatic adjustment. The process is repeated at subsequent posting periods over the retail life cycle of the product.

While percentage markdowns are shown in markdown profile 10 illustrated in FIG. 1, it is envisioned that other types of buying incentives could be used instead of a simple percentage markdown of retail price. For example, a markdown profile could propose a distribution of a coupon to encourage sales to achieve the target sales quota.

It is important to note that the computer system on which the markdown profile is running and implemented has access to the data necessary to propose the markdown to the user. That is, the system has access to the actual sales from the relevant store or stores for the relevant product or services during the relevant posting periods. It is envisioned that multiple markdown profiles would be provided to the user. These multiple profiles would correspond to different types of products or services, or perhaps would be specific to individual products or services. The user could also create new profiles or revise existing profiles as desired.

To better control pricing for the sale of a retail product or service using markdown profiles, a user may select a markdown profile to be used for the retail product or service of interest. The user may also select the initial retail price for that product or service, and then as time progresses, adjust the retail price of that product or service by the markdown determined from the markdown profile as described above. This adjustment could happen multiple times over the life cycle of the product or service. The system may be programmed to perform the adjusting step at regular intervals such as at the end of each posting period. In this case, it is envisioned that for a product or service that is selling well, no mark-down may be necessary under certain posting periods.

Not shown in FIG. 1 is a data field associated with a markdown profile that pertains to some product characteristic. This data field allows for a markdown profile to be identified as relevant to a specific retail product or to a specific category of retail products.

As mentioned above, the user forms a correspondence between a product or service to be sold and a markdown profile. In an exemplary embodiment of the present invention, the user is provided with a plurality of markdown profiles from which to choose in order to select a markdown profile to be used for a particular product. These markdown profiles are prepared in advance of selection. Alternatively, the user can revise an existing markdown profile or even create an entirely new markdown profile to be used for the particular product.

In order to more efficiently search for potentially applicable and relevant markdown profiles, the markdown profile may contain at least one and possibly three or more assignable attribute fields. These fields contain attribute data regarding a product or service. For example, the fields may contain indicators representing the product type (e.g., raincoats), the color, the size, the sales organization, and the distribution channel. Also, markdown profiles can be differentiated by the applicable sales season or as otherwise desired. Using the attribute field information, the user can search for the markdown profile that best suits the user's need for a particular product or service.

In forming the correspondence between products or services and markdown profiles, the user can assign a markdown profile to entire groups or categories of products or services. For example, one markdown profile can be assigned to all products of a particular type (e.g., raincoats). The user can also more finely correspond specific markdown profiles to sub-groupings of those products. For example, the user could assign a different markdown profile to red raincoats than is assigned to blue raincoats and different than is assigned to the larger category of all raincoats. Indeed, a markdown profile may be specifically tailored for a particular product of a particular color and size. In an exemplary embodiment, if an individual product is not separately assigned a specific markdown profile, then the markdown profile for the relevant larger product category may be used for that product.

While markdown profile 10 in FIG. 1 is shown as a table, it will be apparent to one skilled in the art that other configurations could be used to convey the same information. Furthermore, markdown profiles can represent information about the sales of a product or service in a given store or for a group of stores. They can also represent information about the sales of a group or category of products or services.

It is envisioned that a company will have in place limited budgets for applying markdowns to the retail prices of products or services. A company may not want its agents to markdown prices of products or services by significant amounts and for extended periods of time. Accordingly, they may put in place limited markdown budgets for a given product or group of products. In an embodiment of the present invention, when a markdown is proposed, this budget will be checked in order to prevent application of markdowns that will exceed the budgeted amount. In this way, some additional control is exerted over the agents and some additional safety measures are placed on the operation of the system.

Figure 2:
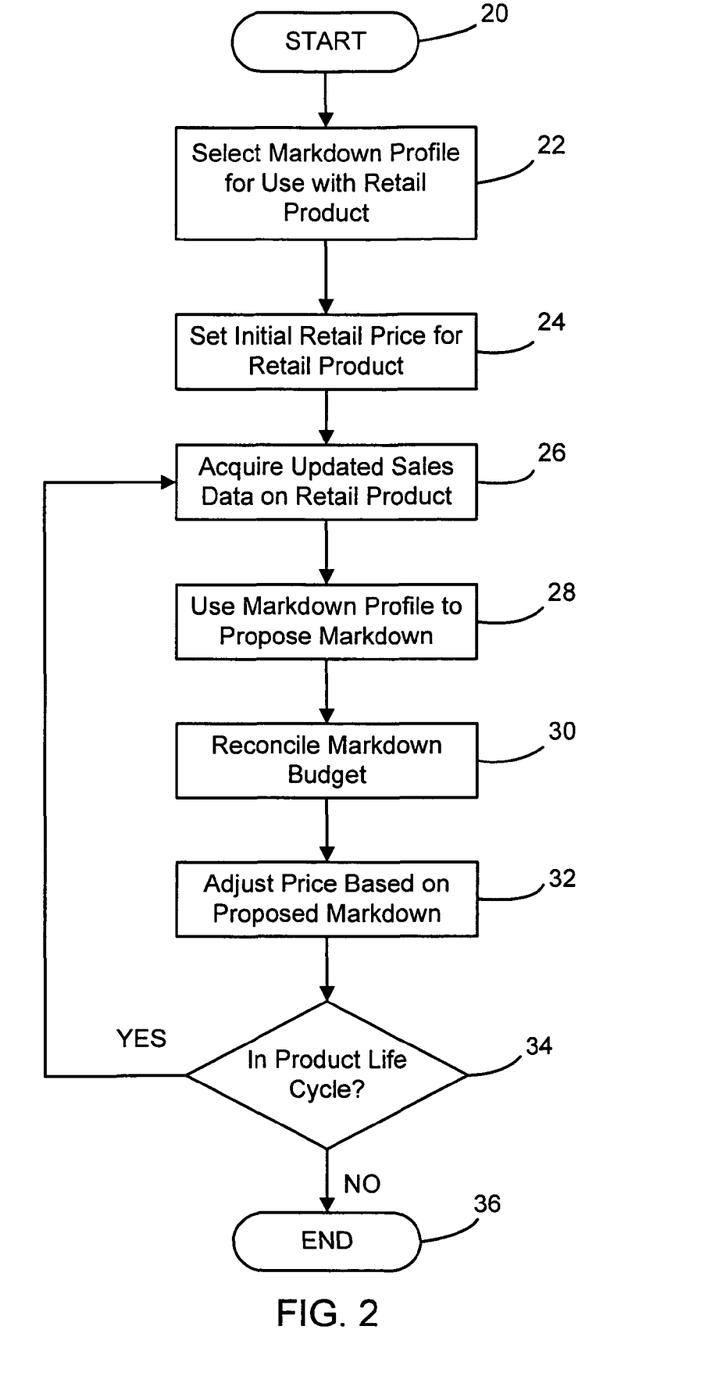
FIG. 2 is a flowchart illustrating basic price control and modification under an embodiment of the present invention;.

FIG. 2 is a flow chart 20 illustrating one embodiment of the present invention with a focus on markdown budget reconciliation. Flowchart 20 begins with a step 22, in which the user or system selects a markdown profile to be used for a retail product. In a step 24, which may be performed before, after or contemporaneously with step 22, the initial retail price of the product is set. A step 26 illustrates the acquisition of updated sales data after some period of time has elapsed while the product has been on sale. This sales data is used in a step 28 in the markdown profile to determine the proposed markdown for the retail product.

In the illustrated embodiment, before a proposed markdown is applied to adjust the retail price of a product, a reconciliation of the markdown budget is performed based on the proposed markdown. This shown in a step 30 in FIG. 2. During this reconciliation, the system determines whether, based on predetermined budget rules, a proposed markdown can actually be applied to adjust the retail price of a product. This determination is made based on whether application of the proposed markdown would result in exceeding the available markdown budget. The predetermined budget rules may include some tolerance factor such that if the budget is exceeded but within the tolerance, it would still allow the markdown to be applied.

If it is determined during reconciliation step 30 that a proposed markdown can indeed be applied to the retail price of a product, the price is then adjusted based on the proposed markdown as shown in a step 32. If it is determined during reconciliation step 30 that a proposed markdown cannot be applied to the retail price of a product, then the proposed markdown is not applied to adjust the price of the product. In an alternate embodiment of the invention, the system would calculate the amount of markdown that could be applied while still complying with the predetermined rules regarding the available markdown budget. This allowable markdown could then be applied to adjust the retail price of the product.

The budgets for each product or group of products are tracked and maintained centrally, preferably in the same system that performs the markdown control. A "planned budget" refers to the budget for markdowns of a product for a particular period. An "exhausted budget" refers to the total amount of markdown that has been applied during the period. When a sale begins and during the course of the period, the "exhausted budget" increases. At the end of the period, the "exhausted budget" equals the total amount of the markdown applied on the product for that period, based on actual numbers of products sold. A "cumulative budget" refers to the budget amount remaining for a particular product from the previous period; that is, previous to the period corresponding to the planned budget. This cumulative budget may be a positive or a negative number. A negative number would indicate that the planned budget for the previous period had been exceeded. The "available' budget" is a calculated value determined by adding the "planned budget" to the "cumulative budget" carrying over from the previous period and subtracting from that the 'exhausted budget' for the current period. This available budget corresponds to the amount of markdown that is still available to be applied.

In another embodiment of the invention, the proposed markdown is subject to approval or rejection by a user and, in the case of rejection, adjustment step 32 need not be performed. In any event, the exemplary method returns to acquiring updated sales data in step 26 so long it is still within the product lifecycle as determined in a step 34. The frequency of acquiring updated sales data and determining a markdown can be adjusted by the user. In an exemplary embodiment, it is performed once per posting period. Once the life cycle of the product has been exhausted, it is assumed that the product will not be offered for sale until some later time, if at all, and the use of the markdown profile is ended in a step 36.

In an exemplary embodiment of the present invention, the target sales ratios in the markdown profiles discussed above represent "ideal" sales ratios where no markdowns are needed to achieve the desired goals. However, these ideal sales ratios are not necessarily realistic ones when it comes to planning actual sales of a product over its life cycle, which may be done for various purposes such as strategic planning. For planning purposes, therefore, it may be preferable to use one or more sales patterns that are associated with a specific markdown profile and contain more realistic sales ratios. A sales pattern contains planned sales quotas for a certain markdown profile for the periods given by the markdown profile. For example, three or more sales patterns could be provided for each markdown profile: realistic, optimistic and pessimistic.

Figure 3A:
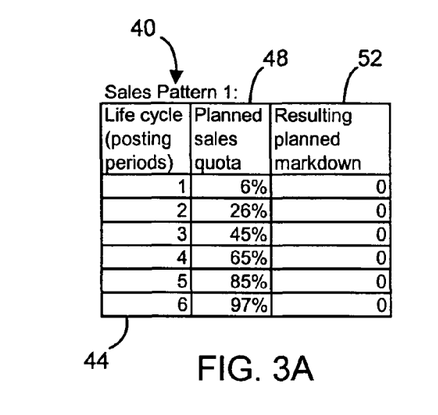
FIGS. 3A and 3B illustrate a pair of sales patterns in accordance with an exemplary embodiment of the present invention.
Figure 3B:
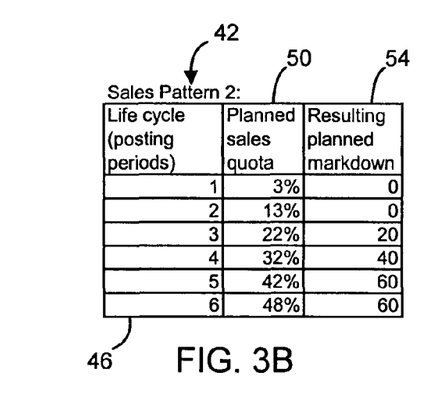

FIGS. 3A and 3B illustrate two different sales patterns 40 and 42, both of which may be associated with markdown profile 10 in FIG. 1. Once this association is made, sales patterns 40 and 42 can be used to simulate the effects of markdown profile 10 as described in detail below. Each sales pattern 40 and 42 contains planned markdowns based on markdown profile 10 for planned sales quotas given in the sales pattern. If a markdown is proposed for a particular posting period in the sales pattern, the markdown can be transferred to the next posting period.

In sales patterns 40 and 42, columns 44 and 46 labeled "Life cycle (posting periods)" are identical to column 14 in markdown profile 10. Columns 48 and 50 contain the (realistically) planned sales quota. The values for the planned markdown in columns 52 and 54 are the result of the planned sales quota and markdown profile 10. In particular, the planned price reductions in columns 52 and 54 are determined from markdown profile 10 and the planned sales ratios in columns 48 and 50, respectively, from the previous posting periods according to the following rules:

(i) If a markdown results from the planned sales ratio and the markdown profile from a period, this markdown is transferred to the next posting period of the sales pattern as a planned price reduction. This assumes that a markdown proposed at the end of a period is accepted and the price in the next period is reduced.

(ii) If based on the planned sales ratio and the markdown profile, a period results in a markdown that is less than the price reduction planned for this period, this lower markdown is ignored. This means that prices will not be raised after a particularly good period.

Figure 4:
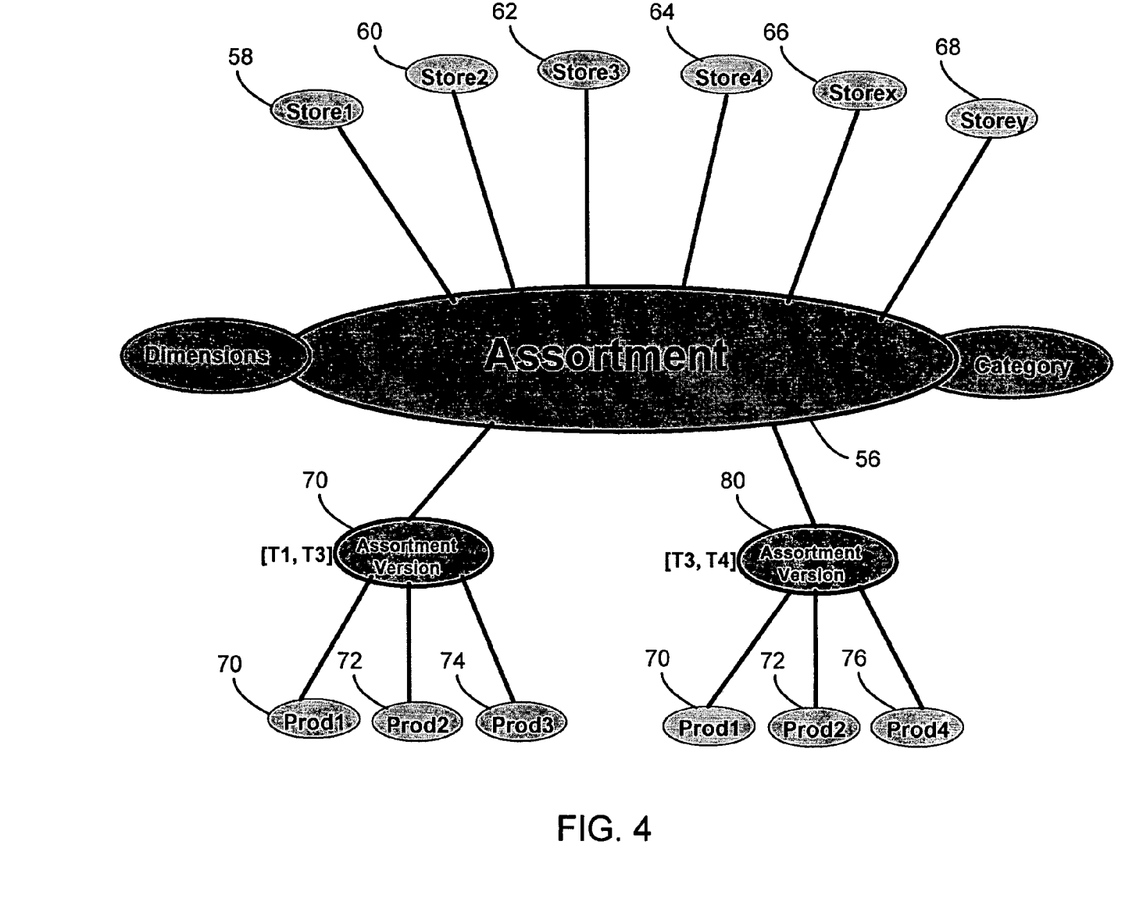
FIG. 4 illustrates a global assortment that links together a plurality of stores and a plurality of products at specific times according to an exemplary embodiment.

As mentioned above, markdown profiles may be used for markdown controlling during the season. As also mentioned above, sales patterns may be used with markdown profiles to facilitate assortment planning before the season begins. Assortment planning involves matching the right products with the right stores at the right times. An exemplary assortment is shown in FIG. 4, which is discussed in further detail below.

In an exemplary embodiment of the present invention, sales can be efficiently and accurately planned using information from the markdown profile and an associated sales pattern. More specifically, planned sales of products and services may be simulated by multiplying one or more planned sales quota percentages obtained from the sales pattern by the quantity of the one or more products or services and generating planned sales prices by multiplying one or more resulting planned markdown percentages obtained from the sales pattern by the original price of the one or more products or services. For example, assume that a product A has a life cycle (season) of only 6 periods and the plan is to sell 10,000 pieces. In this case, if sales pattern 42 in FIG. 3B is used for simulating planned sales of product A, the following will result:

(i) In period 1, the plan is to sell (3%–0%)*10,000=300 pieces at (100%–0%)=100% of the original sales price.
(ii) In period 2, the plan is to sell (13%–3%)*10,000=1,000 pieces at (100%–0%)=100% of the original sales price.
(iii) In period 3, the plan is to sell (22%–13%)*10,000=900 pieces at (100%–20%)=80% of the original sales price.
(iv) In period 4, the plan is to sell (32%–22%)*10,000=1,000 pieces at (100%–40%)=60% of the original sales price.
(v) In period 5, the plan is to sell (42%–32%)*10,000=1,000 pieces at (100%–60%)=40% of the original sales price.
(vi) In period 6, the plan is to sell (48%–42%)*10,000=600 pieces at (100%–60%)=40% of the original sales price.

According to an exemplary embodiment, a sales pattern is an object that is usable only in conjunction with a markdown profile. The sales pattern can be uniquely identified by identifying the specific markdown profile and the sales pattern itself. Therefore, it is possible to have multiple different sales patterns with the same name, but belonging to different markdown profiles, e.g. sales patterns 'optimistic' of markdown profiles 'Summer' and 'Fall'.

In an exemplary embodiment, the markdown profile is specified during assortment planning prior to specifying the sales pattern. This narrows the selection of possible sales patterns to only those that have been created with reference to the particular markdown profile.

Turning now to FIG. 4, an exemplary assortment 56 is shown for linking together a plurality of stores 58, 60, 62, 64, 66, and 68 and a plurality of retail products 70, 72, 74, and 76 at specific times. In this embodiment, retail products 70-76 are linked to assortment 56 by assortment versions 78 and 80. According to an exemplary embodiment, assortment versions 78 and 80 may include retail products that are hierarchically grouped according to a product hierarchy structure.

In the illustrated embodiment, each of assortment versions 78 and 80 is active or valid for specified period of time (e.g., valid-from/valid-to dates). For example, retail products 70, 72 and 74 are linked to assortment 56 by assortment version 78, which is active between dates/times T1 and T3. Similarly, retail products 70, 72 and 76 are linked to assortment 56 by assortment version 80, which is active between dates/times T3 and T4. As persons skilled in the art will recognize, the foregoing time dependencies of the assignments of retail products or services 70-76 to assortment 56 through assortment versions 78 and 80 provides for automatic regular (e.g., every month or six weeks) releases of merchandise in the stores to maintain assortment freshness.

According to an exemplary embodiment, assortment versions 78 and 80 may include differing groups of retail products or services that are hierarchically grouped according to a hierarchical product structure, such as article hierarchy based on "seasonal" attributes of the various products. A "season" refers to a specific time period with specific assortment characteristics. Each season, in turn, may be characterized by a season category and a season year. For example, a season may be characterized according to a calendar (e.g., fall/winter 2004 and spring/summer 2005) or based on a special event (e.g., Christmas 2004). Thus, in one embodiment, assortment version 78 may contain a hierarchical grouping of products associated with "fall/winter 2004" and assortment version 80 may contain another hierarchical grouping of products associated with "spring/summer 2005."

Figure 5:
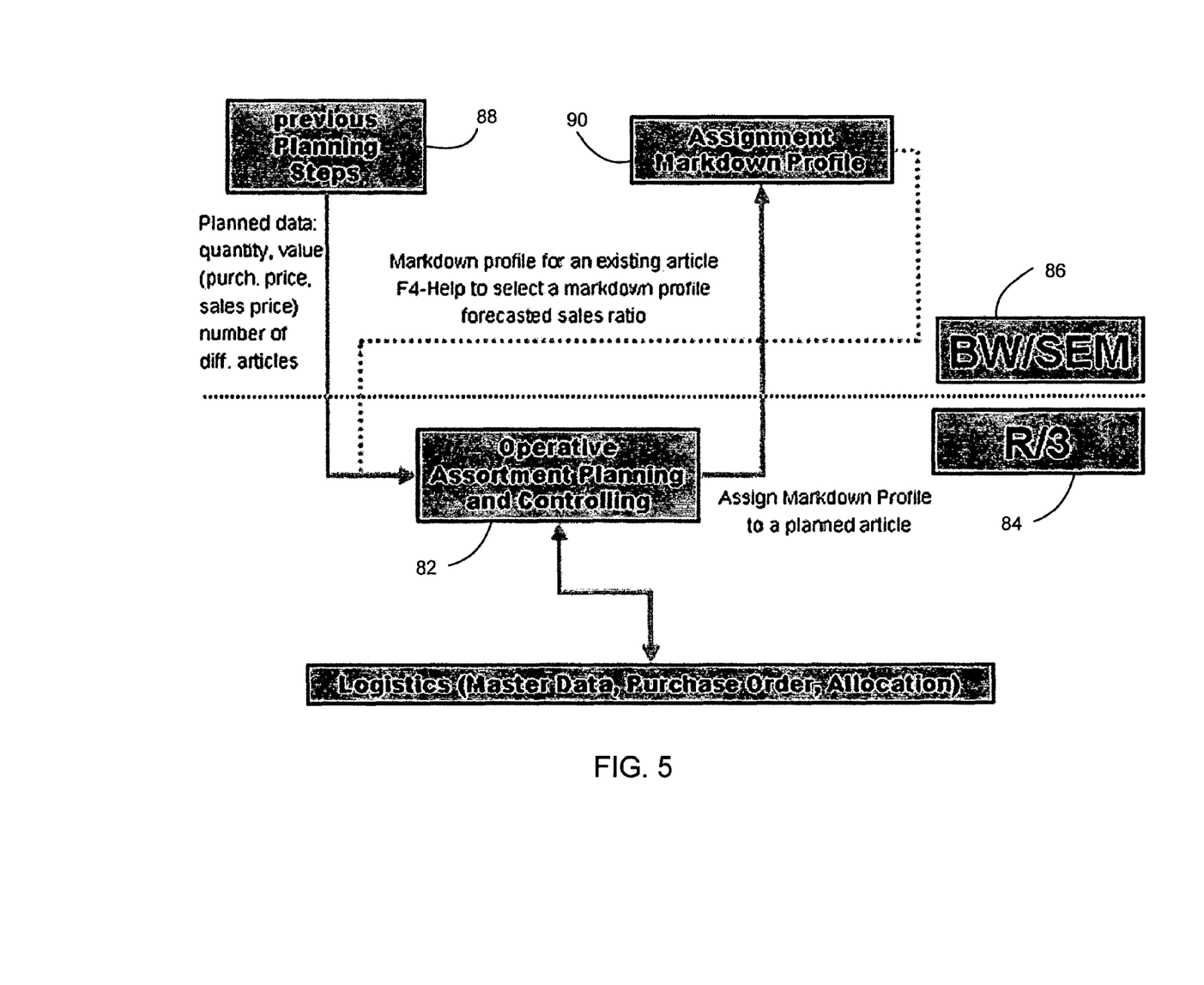
FIGS. 5 and 6 are schematic block diagrams of a system for assigning markdown profiles to products and performing assortment planning in connection with an exemplary embodiment of the present invention.
Figure 6:
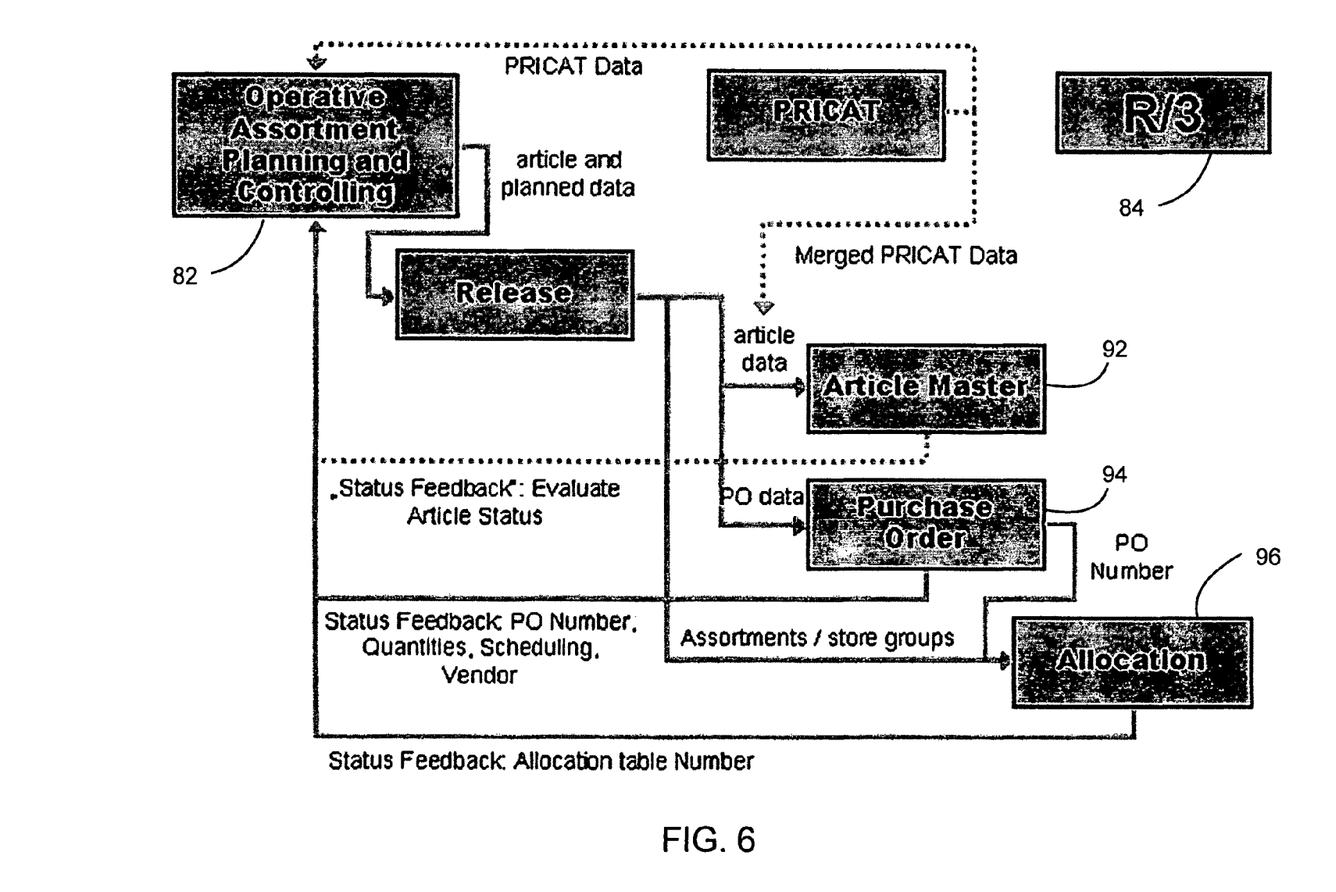

Referring now to FIGS. 5 and 6, an operative assortment planning and control (OAPC) engine 82 is illustrated running on an enterprise resource planning ("ERP") system 84 (identified as an "R/3" system provided by SAP Aktiengesellschaft) configured for processing retail sales data. ERP system 84 is connected to a data warehouse system 86 (identified as a "BW/SEM" system provided by SAP Aktiengesellschaft) that provides a data repository configured to similarly receive, sort, process, and store retail sales data. ERP system 84 and BW system 86 may also be configured to facilitate planning, provide reporting, and perform other functions associated with managing retail sales data. As persons skilled in the art will recognize, a single integrated system could be used in place of ERP system 84 and BW system 86.

According to an exemplary embodiment, OAPC engine 82 has an inbound interface which receives data from upstream processes running on BW system 86. In the illustrated embodiment, the upstream processes include previous planning steps 88 and the assignment of markdown profiles 90.

In the illustrated embodiment, data that is "pushed" (or written) from an upstream process to OAPC engine 82 is indicated by a solid line, and data that is "pulled" (or read) by OAPC engine 82 is indicated by a dashed line. By way of example, the following data may be pushed or pulled from upstream processes:

(i) Key performance indicator "fixed initial stock-up" (on a quantity and value basis: purchase price, sales price) at various levels (e.g., article hierarchy node, season/season year, rollout, global assortments assigned to the hierarchy node).

(ii) Key performance indicator "variable initial stock-up" on a quantity and value basis at the same levels.

(iii) Key performance indicator "putaway quantity" on a quantity and value basis at various levels (e.g., article hierarchy node, season/season year, rollout, distribution center).

(iv) The number of different generic articles (or single articles) per key performance indicator in the assortments (assortment breadth).

(v) The planned quantities of the key performance indicators "fixed initial stock-up" and "variable initial stock-up" for the assortments are valid for each store contained in the assortment. The planned quantities can also be written to the inbound interface one level above the assortments. In this case, they may be first (manually) distributed to the assortments assigned in the article hierarchy node in OAPC engine 82.

OAPC engine 82 generates output data including assortments/store groups that, upon release, are pushed to downstream processes. In the illustrated embodiment, the output data from OAPC engine 82 is pushed to an article master engine 92, a purchase order engine 94, and an allocation engine 96. Each of these data engines 92-96 provides feedback to OAPC engine 82. Hence, the efficiency of data flow in ERP system 84 is improved because a significant amount of the input and output to the various subsystems is provided automatically (i.e., no need for a user to re-key most or all of the information). Moreover, this also improves the accuracy of ERP system 84 by eliminating data entry errors.

In describing the foregoing exemplary embodiments, the terms "article," "seasonal product," "product" and "retail product" are used to refer to the merchandise being sold, the pricing for which is controlled or affected by the markdown profile as described above. It is envisioned that systems, methods and tools described herein will be applicable to the sale of any type of product or service. Hence, the term "product" is intended to encompass a service. The assortment planning method as described above is preferably implemented on one or more computers.

As noted above, exemplary embodiments of the present invention may include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM or other optical disk storage, magnetic disk storage or other magnetic storage devices, or any other medium which can be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above are also to be included within the scope of computer-readable media. Computer-executable instructions comprise, for example, instructions and data which cause a general purpose computer, special purpose computer, or special purpose processing device to perform a certain function or group of functions.

The exemplary embodiments of the present invention are described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

The present invention in some embodiments, may be operated in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. The exemplary embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the present invention might include a general purpose computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer.

Software and web implementations of embodiments of the present invention could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the present invention has been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. Machine-readable media for planning sales of products using an automated process, the machine-readable media comprising program code stored therein executable by one or more processors to perform the automated process, the automated process comprising:

selecting by the one or more processors based on the program code a first markdown profile associated with the products of a particular type, the products of the particular type comprising a first product and a second product, the first markdown profile comprising a plurality of posting periods, a plurality of target sales quota ranges each corresponding to one of the posting periods, and a plurality of actual sales quota ranges, the plurality of target sales quota ranges relating to a product life cycle, wherein the first markdown profile further comprises a proposed markdown for at least some intersecting pairs of actual sales quota ranges and posting periods;

selecting by the one or more processors based on the program code a second markdown profile for the first product;

assigning by the one or more processors based on the program code the first markdown profile associated with the products of particular type to the second product based on a specific markdown profile not being selected for the second product;

selecting by the one or more processors based on the program code a first sales pattern associated with the first markdown profile from a plurality of sales patterns associated with the first markdown profile, wherein the first sales pattern comprises a plurality of planned sales quota ranges, wherein each planned sales quota range in the plurality of planned sales quota ranges corresponding to a posting period from the plurality of posting periods, wherein the first sales pattern further comprises a planned markdown for each posting period in the plurality of posting periods, wherein each planned markdown is determined based on the first markdown profile and a planned sales quota range;

selecting by the one or more processors based on the program code a second sales pattern associated with the second markdown profile from a plurality of sales patterns associated with the second markdown profile;

determining a first product available markdown budget by adding a first product planned markdown budget to a first product cumulative markdown budget, and subtracting an exhausted markdown budget, wherein the first product planned markdown budget being a budget for markdowns for the first product for a current posting period, the first product cumulative markdown budget being a budget amount remaining for the first product from a previous posting period, and the exhausted markdown budget being a total amount of markdown applied for the first product during the current period;

determining that a first product markdown cost does not exceed the first product available markdown budget by more than a first tolerance and adjusting a first product price by the first product markdown cost;

determining whether a second markdown cost exceeds a second markdown budget by more than a second tolerance and upon determining that the second markdown cost exceeds a sum of the second markdown budget and the second tolerance, determining a second product price adjustment by dividing a second product available budget by a quantity of the second product, and adjusting a second product price by the second product price adjustment;

distributing sales quantities of the first product using the first markdown profile and the first sales pattern; and distributing sales quantities of the second product using the second markdown profile and the second sales pattern.

2. The machine-readable media of claim 1, wherein the sales quantities are manually entered in the first sales pattern and the second sales pattern at a timely aggregated level.

3. The machine-readable media of claim 2, wherein the timely aggregated level is one of a season and a rollout period.

4. The machine-readable media of claim 1, wherein the distributing step includes estimating price reductions for the first product and the second product based on the first markdown profile, the second markdown profile, and the planned sales quota range from a previous posting period.

5. The machine-readable media of claim 4, further comprising transferring a markdown to a next posting period if a markdown results from the planned sales quota range and the markdown profile from a current posting period.

6. The machine-readable media of claim 1, wherein the distributing step comprises simulating planned sales quantities by multiplying one or more planned sales quota percentages obtained from the first sales pattern and the second sales pattern by a total quantity of the one or more products and simulating planned sales prices by multiplying one or more resulting planned markdown percentages obtained from the first sales pattern and the second sales pattern by an original price of the one or more products.

7. A system for planning sales of products, the system comprising machine-readable media comprising program code stored therein executable by one or more processors, comprising:

one or more processors configured to select a first markdown profile associated with the products of a particular type, the products of the particular type comprising a first product and a second product, the first markdown profile comprising a plurality of posting periods, a plurality of target sales quota ranges each corresponding to one of the posting periods, and a plurality of actual sales quota ranges, the plurality of target sales quota ranges relating to a product life cycle, wherein the first markdown profile further comprises a proposed markdown for at least some intersecting pairs of actual sales quota ranges and posting periods;

the one or more processors configured to select a second markdown profile for the first product;

the one or more processors configured to assign the first markdown profile associated with the products of particular type to the second product based on a specific markdown profile not being selected for the second product;

the one or more processors configured to select a first sales pattern associated with the first markdown profile from a plurality of sales patterns associated with the first markdown profile, wherein the first sales pattern comprises a plurality of planned sales quota ranges, wherein each planned sales quota range in the plurality of planned sales quota ranges corresponding to a posting period from the plurality of posting periods, wherein the first sales pattern further comprises a planned markdown for each posting period in the plurality of posting periods, wherein each planned markdown is determined based on the first markdown profile and a planned sales quota range;

the one or more processors configured to select a second sales pattern associated with the second markdown profile from a plurality of sales patterns associated with the second markdown profile;

the one or more processors configured to determine a first product available markdown budget by adding a first product planned markdown budget to a first product cumulative markdown budget, and subtracting an exhausted markdown budget, wherein the first product planned markdown budget being a budget for markdowns for the first product for a current period, the first product cumulative markdown budget being a budget amount remaining for the first product from a previous period, and the exhausted markdown budget being a total amount of markdown applied for the first product during the current period;

the one or more processors configured to determine that a first product markdown cost does not exceed the first product available markdown budget by more than a first tolerance and adjusting a first product price by the first product markdown cost;

the one or more processors configured to determine whether a second markdown cost exceeds a second markdown budget by more than a second tolerance and upon determining that the second markdown cost exceeds a sum of the second markdown budget and the second tolerance, determining a second product price adjustment by dividing a second product available budget by a quantity of the second product, and adjusting a second product price by the second product price adjustment;

the one or more processors configured to distribute sales quantities of the first product using the first markdown profile and the first sales pattern; and the one or more processors configured to distribute sales quantities of the second product using the second markdown profile and the second sales pattern.

8. The system of claim 7, wherein the one or more processors is configured to receive the sales quantities in the first sales pattern and the second sales pattern at a timely aggregated level.

9. The system of claim 8, wherein the timely aggregated level is one of a season and a rollout period.

10. The system of claim 7, wherein the one or more processors is configured to estimate price reductions for the first product and the second product based on the first markdown profile, the second markdown profile, and the planned sales ratios from a previous posting period.

11. The system of claim 10, wherein the one or more processors is configured to transfer a markdown to a next posting period if a markdown results from the planned sales ratio and the markdown profile from a current posting period.

12. The system of claim 7, wherein the one or more processors is configured to simulate planned sales quantities by multiplying one or more planned sales quota percentages obtained from the first sales pattern and the second sales pattern by a total quantity of the one or more products or services and to simulate planned sales prices by multiplying one or more resulting planned markdown percentages obtained from the first sales pattern and the second sales pattern by an original price of the one or more products.

13. A program product for planning sales of products, the program product comprising machine-readable code for causing, when executed, one or more machines to perform the following method steps:

selecting by a processor a first markdown profile associated with the products of a particular type, the products of the particular type comprising a first product and a second product, the markdown profile comprising a plurality of posting periods, a plurality of target sales quota ranges each corresponding to one of the posting periods, and a plurality of actual sales quota ranges, the plurality of target sales quota ranges relating to a product life cycle, wherein the first markdown profile further comprises a proposed markdown for at least some intersecting pairs of actual sales quota ranges and posting periods;

selecting by the processor a second markdown profile for the first product;

assigning by the processor the first markdown profile associated with the products of particular type to the second product based on a specific markdown profile not being selected for the second product;

selecting by the processor a first sales pattern associated with the second markdown profile from a plurality of sales patterns associated with the first markdown profile, wherein the first sales pattern comprises a plurality of planned sales quota ranges, wherein each planned sales quota range in the plurality of planned sales quota ranges corresponding to a posting period from the plurality of posting periods, wherein the first sales pattern further comprises a planned markdown for each posting period in the plurality of posting periods, wherein each planned markdown is determined based on the first markdown profile and a planned sales quota range;

selecting by the processor a second sales pattern associated with the first markdown profile from a plurality of sales patterns associated with the second markdown profile;

determining a first product available markdown budget by adding a first product planned markdown budget to a first product cumulative markdown budget, and subtracting an exhausted markdown budget, wherein the first product planned markdown budget being a budget for markdowns of the first product for a current period, the first product cumulative markdown budget being a budget amount remaining for the first product from a previous period, and the exhausted markdown budget being a total amount of markdown applied for the first product during the current period;

determining that a first product markdown cost does not exceed the first product available markdown budget by more than a first tolerance and adjusting a first product price by the first product markdown cost;

determining whether a second markdown cost exceeds a second markdown budget by more than a second tolerance and upon determining that the second markdown cost exceeds a sum of the second markdown budget and the second tolerance, determining a second product price adjustment by dividing a second product available budget by a quantity of the second product, and adjusting a second product price by the second product price adjustment;

distributing sales quantities of the first product using the first markdown profile and the first sales pattern; and distributing sales quantities of the second product using the second markdown profile and the second sales pattern.

14. The program product of claim 13, wherein the sales quantities are manually entered in the sales pattern at a timely aggregated level.

15. The program product of claim 14, wherein the timely aggregated level is one of a season and a rollout period.

16. The program product of claim 13, wherein the distributing step includes estimating price reductions for the first product and the second product based on the first markdown profile, the second markdown profile, and the planned sales ratios from a previous posting period.

17. The program product of claim 16, further comprising transferring a markdown to a next posting period if a markdown results from the planned sales ratio and the markdown profile from a current posting period.

18. The program product of claim 13, wherein the distributing step comprises simulating planned sales quantities by multiplying one or more planned sales quota percentages obtained from the first sales pattern and the second sales pattern by a total quantity of the one or more products and simulating planned sales prices by multiplying one or more resulting planned markdown percentages obtained from the first sales pattern and the second sales pattern by an original price of the one or more products.

* * * * *